US007240185B2

(12) United States Patent
Cofler et al.

(10) Patent No.: US 7,240,185 B2
(45) Date of Patent: Jul. 3, 2007

(54) COMPUTER SYSTEM WITH TWO DEBUG WATCH MODES FOR CONTROLLING EXECUTION OF GUARDED INSTRUCTIONS UPON BREAKPOINT DETECTION

(75) Inventors: Andrew Cofler, Voreppe (FR); Laurent Wojcieszak, Meylan (FR); Isabelle Sename, Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 467 days.

(21) Appl. No.: 09/748,785

(22) Filed: Dec. 22, 2000

(65) Prior Publication Data

US 2001/0005881 A1    Jun. 28, 2001

(30) Foreign Application Priority Data

Dec. 23, 1999    (GB) ................................ 9930586.4

(51) Int. Cl.
*G06F 11/36*    (2006.01)
(52) U.S. Cl. ..................................................... 712/227
(58) Field of Classification Search .................. 712/43, 712/214, 215, 226, 227; 717/124, 129, 134
See application file for complete search history.

(56) References Cited

U.S. PATENT DOCUMENTS

| | | |
|---|---|---|
| 4,187,539 A | 2/1980 | Eaton |
| 5,404,496 A | 4/1995 | Burroughs et al. |
| 5,430,862 A | 7/1995 | Smith et al. |
| 5,442,757 A | 8/1995 | McFarland et al. |
| 5,544,311 A | 8/1996 | Harenberg et al. |
| 5,546,599 A * | 8/1996 | Song ............................ 712/23 |
| 5,564,041 A | 10/1996 | Matsui et al. |

(Continued)

FOREIGN PATENT DOCUMENTS

EP    0 667 576    8/1995

(Continued)

OTHER PUBLICATIONS

Hennessy and Patterson, "Computer Architecture—A Quantitative Approach, 2nd Edition," 1996, p. 184.*

(Continued)

*Primary Examiner*—Eddie Chan
*Assistant Examiner*—David J. Huisman
(74) *Attorney, Agent, or Firm*—Lisa K. Jorgenson; James H. Morris; Wolf, Greenfield & Sacks, P.C.

(57) ABSTRACT

A computer system is provided with precise and non-precise watch modes. The computer system is a pipelined system in which the fate of an instruction is determined at the decode stage. Once instructions have been decoded, it is not possible for them to be "killed" later in the pipeline. According to the precise watch mode, instructions are held at the decode stage until the guard value has been resolved to determine whether or not that instruction is committed. Actions of the decode unit are determined in dependence on whether or not the instruction is committed when the guard has been resolved. According to a non-precise watch mode, instructions continue to be decoded and executed normally until a breakpoint instruction has had its guard resolved. At that point, an on-chip emulator can take over operations of the processor in a divert mode. The computer system can take into account different intrusion levels while implementing the watch modes.

18 Claims, 5 Drawing Sheets

U.S. PATENT DOCUMENTS

| | | | |
|---|---|---|---|
| 5,627,981 A * | 5/1997 | Adler et al. | 712/235 |
| 5,644,703 A | 7/1997 | Kurakazu et al. | |
| 5,715,440 A | 2/1998 | Ohmura et al. | 395/580 |
| 5,717,909 A | 2/1998 | Nemirovsky et al. | |
| 5,752,013 A | 5/1998 | Christensen et al. | 395/467 |
| 5,754,839 A | 5/1998 | Pardo et al. | |
| 5,857,094 A | 1/1999 | Nemirovsky | |
| 6,353,883 B1 * | 3/2002 | Grochowski et al. | 712/240 |

FOREIGN PATENT DOCUMENTS

| | | |
|---|---|---|
| EP | 0 720 092 | 12/1995 |
| EP | 0810519 A2 | 12/1997 |
| EP | 0 849 674 A2 | 6/1998 |
| EP | 0 869 434 | 10/1998 |
| EP | 0 943 995 | 9/1999 |

OTHER PUBLICATIONS

Hennessy and Patterson, "Computer Architecture—A Quantitative Approach, $2^{nd}$ Edition," 1996, p. 180.*

British Search Report from British priority application No. 9930586.4, filed Dec. 23, 1999.

Standard Search Report in connection with British counterpart of U.S. Appl. No 09/748,077.

Standard Search Report in connection with British counterpart of U.S. Appl. No. 09/748,762.

Standard Search Report in connection with British counterpart of U.S. Appl. No. 09/748,763.

Standard Search Report in connection with British counterpart of U.S. Appl. No. 10/021,269.

* cited by examiner

FIG. 10

COMPUTER SYSTEM WITH TWO DEBUG WATCH MODES FOR CONTROLLING EXECUTION OF GUARDED INSTRUCTIONS UPON BREAKPOINT DETECTION

FIELD OF THE INVENTION

The present invention relates to a computer system with localized on-chip debug facility.

BACKGROUND OF THE INVENTION

With the advent of more highly embedded, high performance processors it is becoming increasingly important to improve debug facilities to allow these processors to be properly debugged, preferably in real time and in a non-intrusive fashion.

A single chip integrated circuit can now integrate, on the same chip, a processor and a debug or emulation unit. The emulation unit can be connected to an on-chip link which allows off-chip communication to a similar off-chip link, and thus to a debug host. This allows the on-chip emulation unit to behave autonomously in relation to certain observed conditions of the processor, or to be controlled from the debug host to allow a user to take over debugging when necessary.

It is important for an on-chip emulation unit to operate with very low intrusion levels, particularly for debugging real time applications. Moreover, it is advantageous if high priority interrupts can be serviced at full speed, that is ahead of debugging routines that might be running.

A particular problem arises in debugging processors which rely on predicated execution. According to the principle of predicated execution, instructions to be executed are each guarded against a particular one of a set of guards. The instruction is finally executed or not depending on resolution of the guard, that is determination of the value of the guard as true or false. Normally, if the guard is resolved as true, the instruction is said to be committed and is executed. If the guard value is resolved as false, the instruction is not executed and has no effect on the architectural state of the machine. It is possible to have so-called falsely guarded instructions which are committed if the guard is false, and not executed if the guard is true. In a pipelined machine, the guard may not be resolved until a number of pipelined cycles later than the instruction has been fetched from memory. Thus, debugging schemes which take over the machine when a particular instruction address has been detected at the fetch stage may do so unnecessarily in a situation where the guard value would later have been resolved as false.

It is an object of the present invention to provide a debug facility which can reduce the level of intrusion in certain circumstances.

SUMMARY OF THE INVENTION

According to one aspect of the present invention there is provided a computer system for executing predicated instructions wherein each instruction includes a guard, the value of which determines whether or not that instruction is executed, the computer system comprising: a fetch unit for fetching instructions to be executed; a decode unit for decoding said instructions; at least one pipelined execution unit for executing decoded instructions and being associated with a guard register file holding values of the guards to allow resolution of the guards to be made; and an emulation unit including control circuitry which cooperates with the decode unit to selectively control the decode unit to implement a precise watch or a non-precise watch on detection of a breakpoint wherein according to a precise watch, the instruction causing the breakpoint is held at the decode unit and, according to a non-precise watch, the instruction causing the breakpoint and subsequent instructions are permitted to be supplied and from the decode unit to the at least one execution unit while guard resolution in said at least one execution pipeline is awaited.

In the described embodiment, the emulation unit includes watch circuitry for watching addresses issued by the fetch unit for fetching instructions to be executed, said watch unit being operable to add a set of diagnostic flags to the instructions in dependence on whether or not an instruction is detected as having a debug effect.

The computer system described herein is particularly useful when implemented as a single chip. In that case, off-chip communication links can be provided attached to the emulation unit.

The computer system can include a program memory for holding the instructions to be executed. Likewise, the emulation unit can be associated with its own emulation program memory for holding debug code which is executed in a debug mode.

According to the precise watch mode, when the emulation unit is in this mode it causes the decode unit to issue a request to the execution pipeline for guard resolution. The guard resolution is transmitted to the control circuitry of the emulation unit which is responsive thereto to control operation of the decode unit. If the instruction is committed, the emulation unit can take over operation of the computer system by issuing a divert command or a go command. If the instruction is not committed, the decode unit can be allowed to continue decoding and executing the instructions.

If a go command is issued by the emulation unit, the instruction causing the breakpoint and subsequent instructions are normally decoded and executed. If a divert command is issued by the emulation unit, the computer system is set into a debug mode such that debug code can be fetched from the program memory associated with the emulation unit.

When the emulation unit is in a non-precise watch mode, the instruction causing the breakpoint and subsequent instructions are decoded and executed normally until such time as the breakpoint-causing instruction reaches the execution pipeline where its guard is resolved. If its guard is resolved such that the instruction is committed, a commit signal is generated to the control circuitry of the emulation unit which is responsive thereto to set the computer system into a debug mode.

The computer system can include a microinstruction generator which receives instructions from the decode unit and supplies microinstructions to the execution pipeline, said microinstructions including fields for holding respective guards to be resolved.

In the described embodiment, the computer system includes a plurality of parallel pipelined execution units, including at least two data unit pipelines for executing data processing instructions and at least two address unit pipelines for executing memory access instructions.

According to another aspect of the present invention there is provided a method of debugging an on-chip processor which is arranged to execute predicated instructions wherein each instruction includes a guard, the value of which determines whether or not that instruction is executed, the method comprising: fetching instructions to be executed; decoding said instructions; executing decoded instructions, said executing step including resolving values of the guards of the instructions; detecting instructions which have a debug effect; and acting on said instructions in dependence on whether the processor is in a precise watch mode or a non-precise watch mode wherein, according to a precise watch mode, the said instruction is not decoded and, according to a non-precise watch mode, the said instruction and subsequent instructions are supplied and executed normally while guard resolution is awaited.

A breakpoint can be detected as a software breakpoint instruction having dedicated opcode, or on the program count (PC) of an instruction as a so-called PC watch instruction. Thus, the term breakpoint or breakpoint instruction used in the following denotes both software breakpoints and PC watch breakpoints.

For a better understanding of the present invention and to show how the same may be carried into effect, reference will now be made by way of example to the accompanying drawings.

DESCRIPTION OF THE PREFERRED EMBODIMENT

Figure 1:
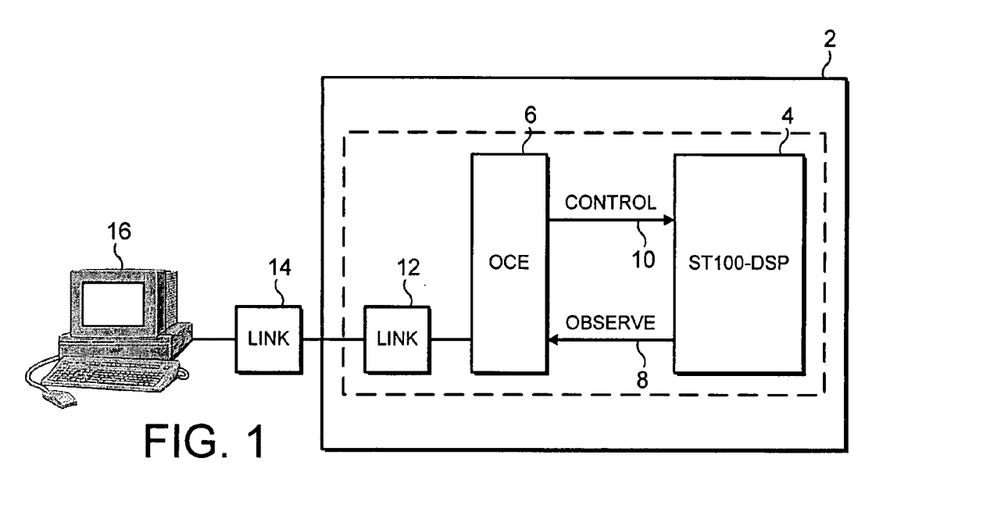
FIG. 1 is a schematic diagram showing the context of the invention.

FIG. 1 is a diagram illustrating the context of the invention. Reference numeral 2 denotes a single chip integrated circuit on which is provided a processor 4 which has a high level of functionality. One of the difficulties which exists with high performance, highly embedded processors is that they can be difficult to debug. Thus, an on-chip emulation (OCE) block 6 is provided on-chip which receives information from the processor along an observe path 8 and provides control when necessary along a control path 10. An on-chip link 12 is connected to the OCE block 6 and provides an off-chip communication path to an off-chip link 14 which is connected to a debugger host 16 which acts to control the on-chip emulator 6. The on-chip emulator 6 can operate autonomously, implementing certain control routines in response to certain observed conditions. As will be described later, the on-chip emulation block includes an on-chip emulation program memory 50 (FIG. 2) which holds debugging code ready for execution by the processor 4 when the OCE block 6 has control of the processor 4. The OCE block 6 also allows control of the processors to be taken over by the off-chip debugger host 16 via the links 12, 14.

Figure 2:
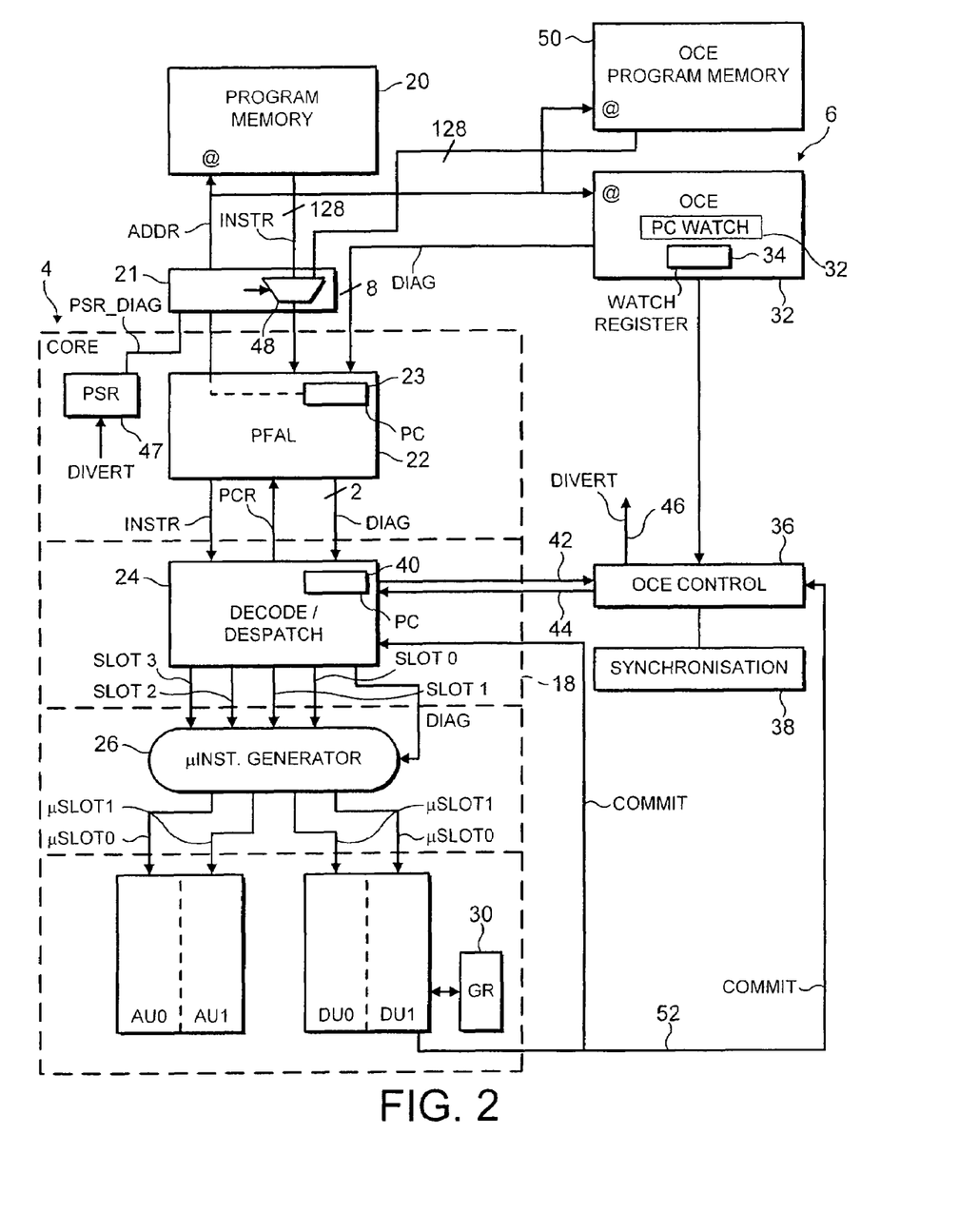
FIG. 2 is a block diagram of a computer system with an emulation unit.

FIG. 2 is a more detailed schematic of the processor 4 in combination with selected on-chip emulation functional blocks which form part of the on-chip emulator 6. The processor 4 comprises a processor core 18 which is connected to a program memory 20 which holds code to be executed by the core. The core comprises a prefetch/align stage 22, a decode/dispatch stage 24, a microinstruction generator 26 and four parallel execution pipelines $AU_0$, $AU_1$, $DU_0$, and $DU_1$. The processor 4 operates in a pipelined manner such that all stages can be active at the same time, on different instructions. The pipeline stages are denoted by horizontal dotted lines in FIG. 2. It will readily be understood that each execution pipeline itself $AU_0$, $AU_1$, $DU_0$, and $DU_1$ constitutes a number of pipeline stages.

A brief description will now be given of operation of the core 18 sufficient to understand the functionality of the on-chip emulator which will be described later. Other details about the core are not discussed herein.

The program memory 20 contains code in the form of 128-bit long words. Each word contains a plurality of instructions depending on the instruction mode of the processor. In this respect, reference is made to FIG. 3.

Figure 3:
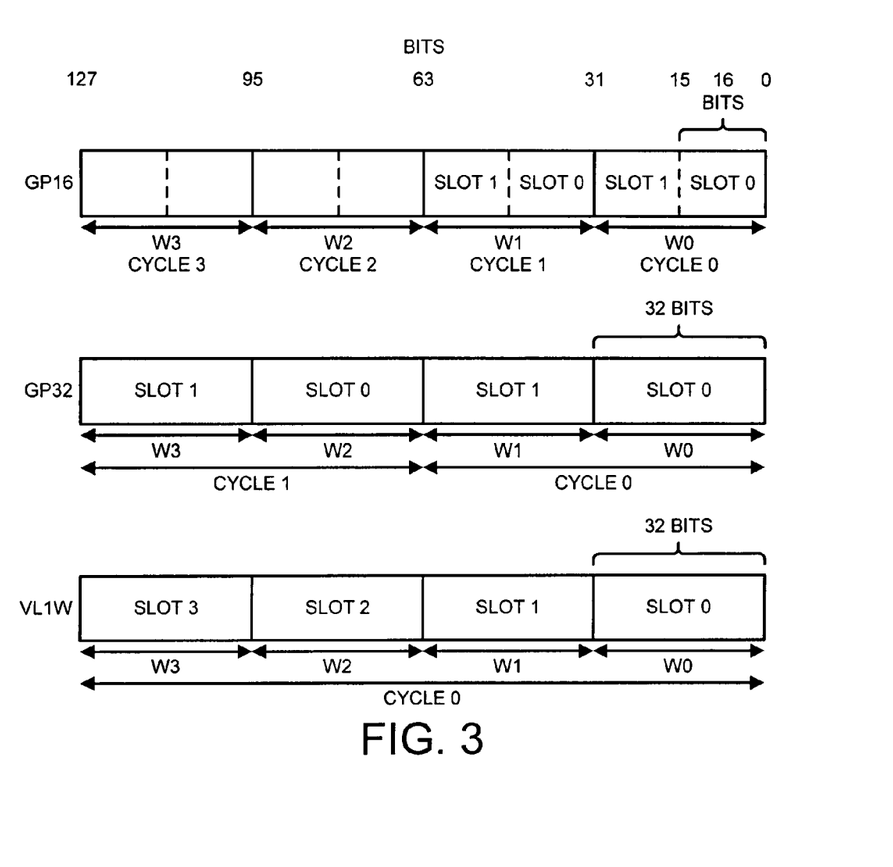
FIG. 3 is a sketch illustrating three different instruction modes of the processor.

According to a first instruction mode, a pair of 16-bit instructions are supplied during each machine cycle to the decoder 24 from the prefetch/align stage buffer 22. This pair is denoted slot0, slot1 in bit sequences w0, w1 etc. This is referred to herein as GP16 superscalar mode.

According to a second instruction mode, two instructions each having a length of 32 bits are supplied to the decoder 24 from the prefetch/align stage 24 in each machine cycle, for example w0, w1 in CYCLE 0. This mode is referred to herein as GP32 superscalar mode.

According to a third instruction mode, four instructions w0, w1, w2, w3 each of 32 bits in length are supplied to the decoder in each machine cycle. This is referred to herein as VLIW mode.

In all modes, each fetch operation initiated to the program memory 2 retrieves an instruction word of 128 bits in length. Thus, in GP16 mode, the instruction word comprises eight 16-bit instructions, paired as slot0, slot1 for each machine cycle. In GP32 and VLIW mode, the instruction word comprises four 32-bit instructions.

The prefetch/align stage 22 includes a fetch program counter 28 which is responsible for issuing addresses to fetch instruction words from the program memory 20.

Instructions are supplied to the decode/dispatch stage 24 depending on the instruction mode of the processor. That is, two GP32 instructions or two GP16 instructions are supplied in each cycle of operation. In VLIW mode, the four VLIW sub-instructions are supplied simultaneously to the decode/dispatch stage 24. The decode/dispatch stage 24 issues an acknowledge signal ACK to say that it has accepted the instructions to be decoded. It is an important feature of this machine that, once the decode/dispatch stage 24 has accepted its instructions and issued an acknowledgement signal ACK, these instructions will proceed to the remaining stages of the pipelined core. An instruction cannot be "killed" after the decode/dispatch stage 24, although of course they may not be executed if the guard is false. The instruction fetches are speculative since fetched instructions may never be executed by the core.

The decode/dispatch stage 24 supplies instructions to the microinstruction generator 26. The microinstruction generator generates microinstructions for the individual execution pipelines depending on the nature of the machine instructions. The execution pipelines $AU_0$, $AU_1$ are address unit pipelines which deal with memory access instructions including loads and stores. The execution pipelines $DU_0$, DU$_1$ are data unit pipelines which deal with data processing instructions including arithmetical and logical calculations.

The processor operates on the basis of predicated execution. That is, each instruction in the program memory 20 is guarded on a guard selected from G$_0$ to G$_{15}$. G$_{15}$ always has a value of one, that is that instruction will always be executed. The values of the guards are held in an architectural guard register file 30. The guard register 30 is associated with the data unit pipelines DU$_0$, DU$_1$ because this is where most of the guard resolution takes place. Special instructions allow guard values to be transmitted to and from the address unit pipelines AU$_0$, AU$_1$ which can, in fact, maintain its own guard register file. For the purposes of the functionality of the on-chip emulator 6, the guard register file 30 associated with the data unit pipeline is the only guard register file of interest, because this is the master guard register file which is maintained up to date architecturally. Thus, this one is used to supply guard values to the OCE. Until the guard on an instruction has been resolved, it is not possible to know whether or not the instruction is committed, that is it has been executed such as to change the architectural state of the machine. For debugging purposes, it is important to know whether an instruction is committed or not. However, this cannot be determined at the decode/dispatch stage 24 because at that stage there has been no resolution of the guard of the instruction. Recall also that there is no mechanism for "killing" instructions after they have been acknowledged by the decode/dispatch stage.

Figure 4:
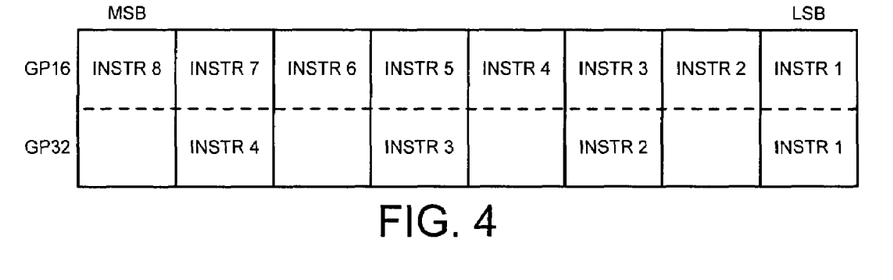
FIG. 4 is a diagram illustrating how the diagnostic flags are set.

The OCE block 6 comprises a PC watch block 32 which snoops addresses issued by the prefetch align state 22 to the program memory 20. Addresses which it is programmed to match are held in a watch register 34. When the PC watch block 32 sees an address which it has been programmed to watch for, so-called diagnostic flags DIAG are added to the instruction word before it is supplied to the prefetch/align stage 22. There are eight possible such diagnostic flags. The diagnostic flags are set according to the different instruction modes. If a diagnostic flag is set this denotes that a particular instruction is a PC (program count) watch, i.e., an instruction of interest to the emulator 6. FIG. 4 illustrates how the diagnostic flags are set in GP16 and GP32 modes. There are eight diagnostic flags because there can be up to eight GP16 instructions in a 128 bit fetch line. The PC watch unit has an exact address of each PC it is looking for and sets the corresponding flag according to the positions illustrated in FIG. 4. In GP16 mode, each flag can be set. In GP32 mode, diagnostic flags can be set on bits 0,2,4 and 6 denoting each GP32 instruction respectively. In VLIW mode, four GP32 diagnostic flags (bits 0,2,4 and 6) can be set.

The prefetch align stage 22 sends to the decode/dispatch stage 24 a 4-bit DIAG flag which denotes which, if any, of the instructions supplied to the decode/dispatch stage 24 are a PC watch. In VLIW mode, each bit denotes one VLIW sub-instruction.

The system described herein allows two watch modes, precise and non-precise. Although the following description of precise and non-precise watching is explained with reference to PC watches, it will be appreciated that the same principles can be used with software breakpoints. That is, special instructions can be included in the code executed by the processor with dedicated opcodes to cause a breakpoint. Such instructions have the same effect in the following as instructions which have been tagged as PC watch instructions. According to a precise PC watch, no subsequent instructions are allowed to enter the execution pipeline, that is beyond the decode/dispatch stage 24. The state of the registers and memory is consistent with the state just before the breakpoint (because the watched instruction has not been executed and has therefore not affected the architectural state of the machine at the point at which the watch is detected). However, the precise PC watch is intrusive and can degrade the performance of the processor. Because the processor is based on predicated execution, there will be occasions where the instruction would not even have been executed because the guard would have been resolved as false. In such circumstances, the performance of the machine has been degraded with no debugging value.

This problem is overcome by allowing non-precise PC watching to be implemented in some circumstances. If the emulator is set to be non-precise, that instruction, and subsequent instructions are allowed to enter the execution pipeline as normal. If, when the instruction has been executed the guard is resolved as true, the OCE at that point can take over operation of the machine for example by implementing a divert. However, if the guard was resolved as false, such that the instruction never affected the architectural state of the machine, the on-chip emulator 6 would take no action and the breakpoint would have caused no intrusion into the performance of the machine. Thus, the breakpoint is minimally intrusive and the performance of the processor is minimally degraded in non-precise PC watching. The instructions that are executed between the breakpoint and the point at which the on-chip emulator 6 takes over operation of the processor are known as the non-precise overrun. There is a small disadvantage for debugging purposes, which is that the state of the machine is now architecturally consistent with the state at the point at which the PC watch instruction becomes committed, that is several instructions after the break point itself and in fact at the end of the non-precise overrun. Thus, debugging may be slightly more complex in this situation, but this is more than offset by the advantages which are gained by the lack of intrusion which non-precise PC watching introduces. The on-chip emulator has in its control registers a user set bit which sets the OCE mode as precise or non-precise.

In order to implement precise and non-precise PC watching, the on-chip emulator 6 has an OCE control unit 36 and a synchronization unit 38 for synchronizing the program count of instructions under watch with commit values supplied by the data unit. The decode/dispatch stage 24 has its own program counter 40 which holds the PC values of instructions currently being decoded. The decode/dispatch unit 24 supplies the PC of each instruction which it receives, together with a flag identifying PC watch instructions, to the OCE control unit 36 along line 42. The PC values are held in a PC FIFO in the synchronization unit 38. Commit values from the data unit are held in a commit FIFO in the synchronization unit, and the OCE only validates the PC watch once it sees that the instruction at that PC was committed. The action of the emulator 6 while awaiting guard resolution depends on whether it is in precise or non-precise watch mode. A signal is returned to the decode/dispatch unit 24 on line 44 indicating the status of the watch. The OCE control block 36 can also set the processor into a debug mode. To achieve this, an architectural bit PSR.DIAG is set inside the program status register 47. This bit is sent with the fetch address to a program memory controller 21. If clear, the fetch is made from the normal program memory. This bit controls a multiplexor 48 in the program memory controller. The on-chip emulator 6 has its own program memory 50 which holds debug code which is executed by the processor core 18 when in debug mode. When the PSR.DIAG bit is set, the fetch is made from the OCE program memory 50 instead of from the normal program memory 20. Thus, fetched debug instructions are executed by the processor as normal instructions.

Figure 5:
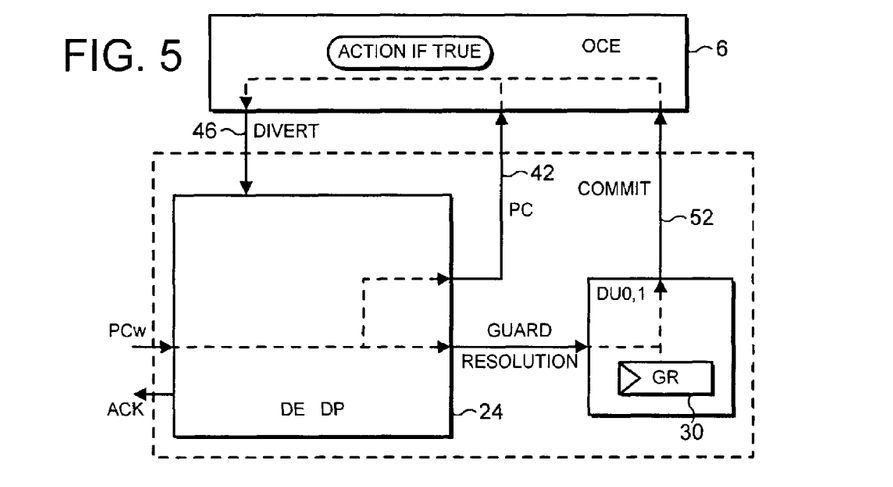
FIG. 5 is a diagram illustrating non-precise PC watching.

Reference will now be made to FIG. 5 to explain non-precise PC watching. The PC watch (or software breakpoint) is detected at the decode/dispatch stage 24 by decoding of the DIAG flags as described above. The instruction is acknowledged as normal by the ACK signal. The instruction is then dispatched as normal to the microinstruction generator 26 and subsequently to the execution pipelines $AU_0$, $AU_1$, $DU_0$, and $DU_1$. The PC of the instruction is sent from the decode/dispatch stage 24 to the OCE control block 36.

At the microinstruction generator 26, guards to be resolved are sent to the data unit pipelines $DU_0$, $DU_1$ in the same microinstruction that the current machine instruction has been encoded as. The manner in which this is done is described later. If the guard is resolved such that the instruction is executed, a Commit signal 52 is sent from the data unit pipelines $DU_0$, $DU_1$ to the on-chip emulator 6. The on-chip emulator 6 checks the PC value in the PC register 28 and determines from the watch register 34 what action should be taken in the event of a committed instruction at that PC value. If that action is a divert, a divert signal 46 is issued to the multiplexor 48, and the prefetch/align stage is issued with a branch address to debug code so that the processor can from that point execute debug code from the OCE program memory 50.

If the guard had been resolved such that the instruction was not executed, no Commit signal would be sent to the on-chip emulator 6 and no debug action would be taken. It will be appreciated that between detecting the PC watch at the decode/dispatch stage 24 and resolving the guard value in the data unit pipelines $DU_0$, $DU_1$, it is possible that a number of other instructions have been executed. In the case that the guard was resolved such that the instruction was not executed, all of these instructions have been properly executed, and the machine can continue to operate without intrusion. In the event that the guard value was resolved as committed, then for debug purposes it will be necessary for the debug host to "unravel" a certain number of instructions which have been executed in between detection of the PC watch at the decode/dispatch stage 24 and resolution of the guard value at the data unit execution pipelines $DU_0$, $DU_1$ (the non-precise overrun).

Figure 6:
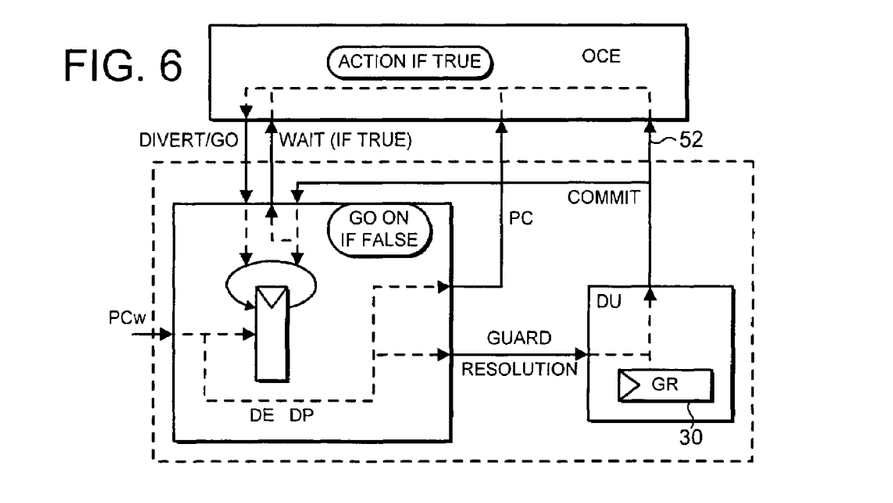
FIG. 6 is a diagram illustrating precise PC watching.

A precise PC watch will now be described with reference to FIG. 6. As in the case of non-precise PC watching, the software breakpoint or PC watch instruction is detected at the decode/dispatch stage 24. A PC value is sent to the OCE control block 36 which, in this case, determines that the instruction is a precise PC watch. This information is returned to the decode/dispatch stage 24 along line 44, and the decode/dispatch stage 24 therefore does not issue a normal acknowledgement instruction. Instead, the decoder issues an instruction to the data unit pipelines $DU_0$, $DU_1$ to request the values of the guards on which the watched instructions are guarded. The decode/dispatch stage 24 enters a waiting state in which it will receive no further instructions. When the value of the guard has been resolved in the data unit execution pipelines $DU_0$, $DU_1$ from the guard register file 30, a Commit signal 52 is sent both to the on-chip emulator 6 and to the decode/dispatch stage 24. If the value has been resolved such that the instruction is committed the value is "1". If the instruction is not committed the value is "0". On receiving a Commit value "1", the decode/dispatch stage 24 waits for a command from the emulator 6 to proceed. The command can be a divert command or a go command. If the command is divert, the PSR.DIAG bit is set so that debug code is fetched from the OCE program memory 50 and the next instructions therefore flush out the existing instructions which were in the prefetch/align stage 22 prior to the instruction which set the PC watch. If the command is "go", the processor is allowed to continue executing the code at which the PC watch was set. It is quite possible to set up a situation such that the emulator 6 issues a go command for the first and second times of a watch instruction being detected, and divert the third time for example.

Both precise and non-precise PC watches allow interrupts to be taken. Interrupts are each issued with particular priority levels. Divert routines for the on-chip emulator also have their own priority levels. Normally, the on-chip emulator divert routines would have a high priority level ensuring that they were executed in place of normal code. However, some interrupts are so important, particularly for real time systems, that they have a priority level higher than the divert routines of the on-chip emulator 6. Such interrupt routines will be executed when the debugger is either in a precise or non-precise PC operating mode.

When in the precise PC watch mode, an interrupt instruction can be taken while the decode/dispatch stage 24 is waiting to receive the Commit signal 52. In that case, the Commit signal which has been received will be ignored and, when returning from the interrupt routine, the prefetch/align stage 22 will present again the PC watch instruction or breakpoint to the decode/dispatch stage, and a new request will be sent to the data unit pipelines for guard resolution.

The interrupt handler code itself may contain a PC watch or break point.

For non-precise PC watching, recall that until the Commit signal is received at the on-chip emulator 6, instructions are being executed as normal. These can include interrupt handling instructions. When the guard values have been resolved, and the Commit signal is sent to the on-chip emulator 6, as described above this can prompt a divert routine to be sent to the decode/dispatch unit 24 for some PC watches. If the interrupt priority is more important than the on-chip emulator priority, this divert will be acknowledged only when the interrupt handler has finished.

Figure 7:
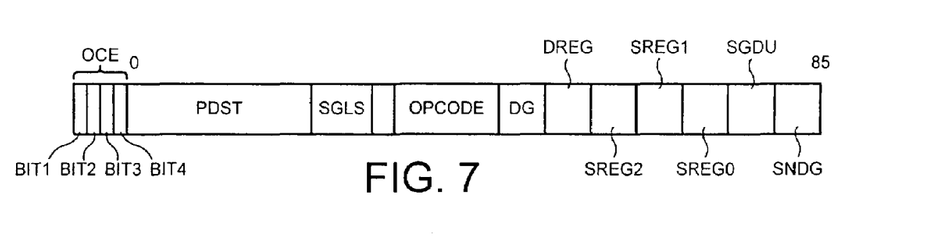
FIG. 7 illustrates a microinstruction format.

It will now be described how guard resolutions are dealt with. FIG. 7 illustrates the format of a microinstruction accepted by the data unit execution pipelines $DU_0$, $DU_1$. The microinstruction format has a number of different fields which are occupied depending on the nature of the machine instruction which caused the microinstruction to be generated.

The SNDG field is used to implement a sendguard instruction to allow guard values to be sent between the data unit pipelines and the address unit pipelines.

The SGDU field indicates that a data unit operation has been guarded and denotes the guard.

There are three source register fields $SREG_0$, $SREG_1$ and $SREG_2$ and a destination register field DREG.

The DG field indicates that a guard value has been modified and is used to synchronize guard values between the address unit pipelines and the data unit pipelines.

An opcode field denotes the operations to be effected by the instruction.

The SGLS field indicates that the load/store part of the instruction is guarded and denotes the guard.

The LDST field indicates that the instruction implements a store or load in and out of load and store data queues. These are not illustrated in the drawings or described further herein because they are not pertinent to the present invention. In brief, they allow data to be queued for accesses to and from main data memory.

The microinstruction format also includes four OCE bits. Bit 1 indicates that the load/store sendguard guard should be inverted before being transmitted to the on-chip emulator 6. This is to take into account instructions which are guarded on a false guard. Normally, instructions are committed if a guard value is read as true. Falsely guarded instructions are committed if the guard value is read as false.

Bit 2 indicates that the value of the guard (i.e. to denote commit or non-commit) read in the SGLS field should be sent to the on-chip emulator 6 and the decode/dispatch stage 24.

Bit 3 indicates that the value of the guard (i.e. to denote commit or non-commit) read in the SGDU field should be sent to the on-chip emulator 6 and decode/dispatch stage 24.

Bit 4 indicates that a store is for the on-chip emulator 6.

Figure 8:
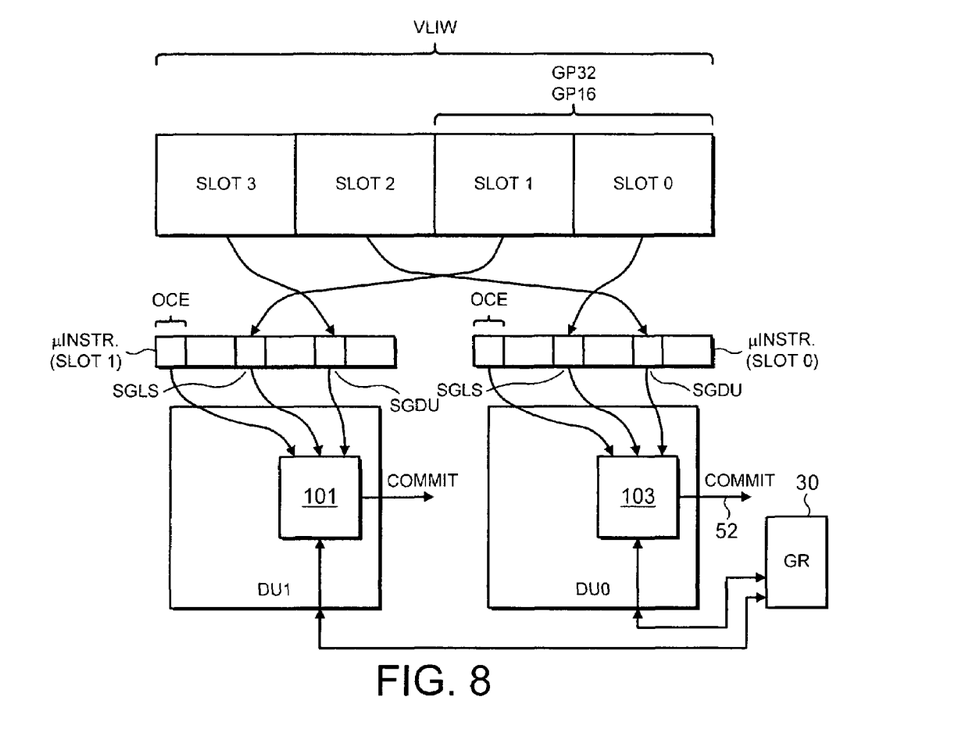
FIG. 8 is a sketch illustrating the architectural aspects of guard resolution.

Thus, it can be seen that there are two fields in the microinstruction which allow guard value resolutions to be carried out, the SGLS and SGDU fields. As two microinstructions can be received by the data unit pipelines DU.sub.0, DU.sub.1 simultaneously, it is possible to convey four guards to be resolved to the data unit pipelines in these two microinstructions. This is useful because it allows all of the possible guards in a VLIW word to be transmitted to the data unit pipelines in the same cycle and thus for the guard values to be resolved without undue delay. This is dealt with in the manner shown in FIG. 8. The data unit execution pipelines DU.sub.0, DU.sub.1 contain circuitry for reading the SGDU and SGLS fields in conjunction with the relevant OCE bits to access the guard register file 30 and generate the Commit signal 52 accordingly. The execution pipelines DU.sub.0, DU.sub.1 deal with the fields in a predetermined order, i.e. DU.sub.0sgls; DU.sub.1sgls; DU.sub.0sgdu; DU.sub.1sgdu to allow synchronization of the commit signals with respective PCs.

It will be appreciated that at any one time the on-chip emulator 6 may hold a number of PCs indicating PC watch instructions which are waiting for respective Commit signals to be returned from the data unit pipelines. This is dealt with in the on-chip emulator by the synchronization unit 38 which includes incoming PCs and Commit values. This allows the Commit signals to be associated with the correct PCs. This is discussed in more detail in our co-pending U.S. application Ser. No. 09/340,776 claiming priority from GB Application No. 9930587.2, entitled A COMPUTER SYSTEM WITH DEBUG FACILITY FOR DEBUGGING A PROCESSOR CAPABLE OF PREDICATED EXECUTION.

Figure 9:
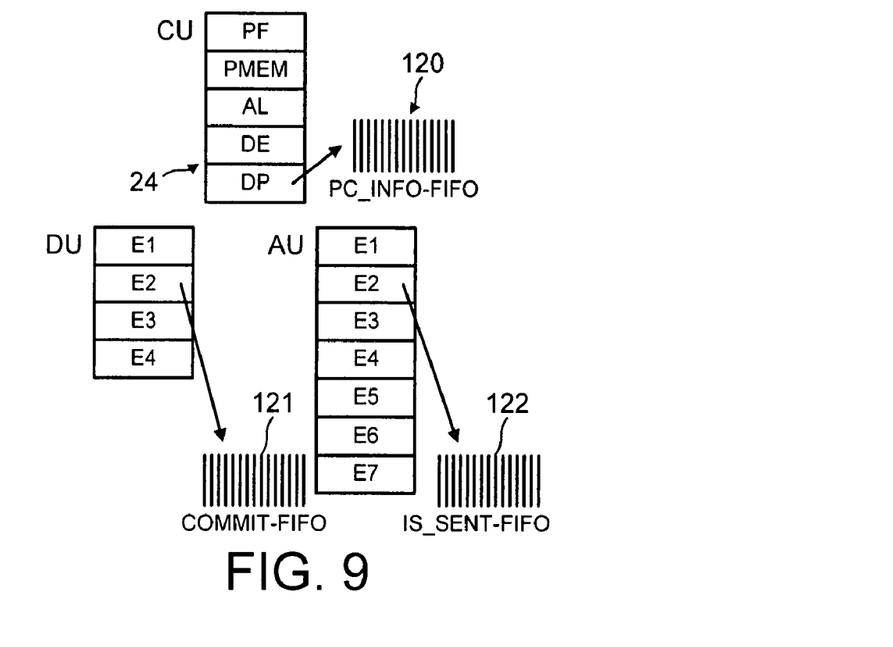
FIG. 9 illustrates schematically FIFOs in the synchronization unit.

For the sake of completeness, the mechanism used in the synchronization unit 38 will be briefly explained with reference to FIG. 9. Instructions are output by the dispatch stage 24 which supplies to a program count FIFO (first in first out buffer) 120 an indication of the program count and an indication if the instruction is a load or store instruction. As the instruction passes through the pipeline stages of the data unit DU the guard value is resolved by hardware 101, 103 provided in the data unit for the normal execution of instructions in the data unit and is not additional hardware for use solely by the debugging operation. In this example the resolution is shown as occurring at stage e2 in the pipeline and the commit signal indicating whether the guard value is resolved as true or false is supplied to a commit FIFO 121. When a load/store instruction is executed in the pipeline within the address unit AU a signal is sent to a load store sent FIFO 122 to indicate whether or not the load/store has been dispatched by the address unit to a data memory controller (not shown). FIFO 120 receives its signals on line 42 of FIG. 2. FIFO 121 receives its signals on line 52 of FIG. 2.

Figure 10:
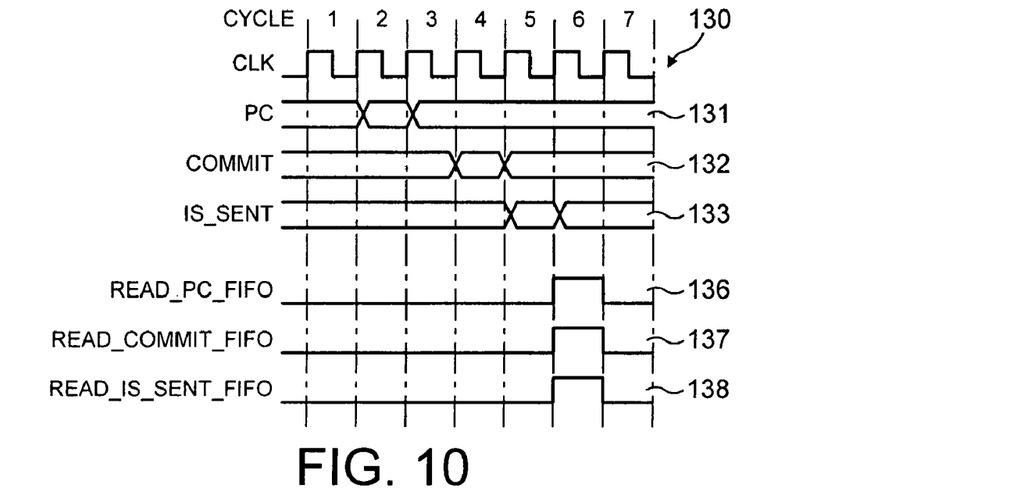
FIG. 10 illustrates a timing diagram for operation of the synchronization unit.

The timing of the synchronization system 38 will be explained with reference to FIG. 10. The cycles of operation of instruction fetches, execution pipelines and memory accesses are controlled by clock cycles with a clock signal as shown at 130 in FIG. 10. The figure illustrates seven successive clock cycles and in this example the program count of the instruction dispatch by dispatch stage 24 occurs in cycle 2 as shown in the program count line 131. The commit signal is sent out in cycle 4 as shown in line 132. The load/store signal from the address unit is provided in cycle 5 as shown in line 133. It will be appreciated that the signal on line 131 was fed into FIFO 120. The signal on line 132 was fed into FIFO 121. The signal on line 133 was fed into FIFO 122. Each of the FIFOs 120, 121 and 122 operate on synchronized clock cycles from the clock signal shown in FIG. 10. Each of the FIFOs 120–122 is then read in clock cycle 6 as shown by lines 136, 137 and 138 in FIG. 10. The result of reading each of those FIFOs on the same clock cycle 9 will indicate correlation between a commit signals and any of the events watched on lines 131–133. The emulator can therefore through use of the synchronization unit 38 establish the program count which was associated with a committed instruction and one which gave rise to a PC watch.

What is claimed is:

1. A computer system for executing predicated instructions wherein each instruction includes a guard, the value of which determines whether or not that instruction is executed, the computer system comprising:
   a fetch unit for fetching instructions to be executed;
   a decode unit for decoding said instructions;
   at least one pipelined execution unit for executing decoded instructions and being associated with a guard register file holding values of the guards to allow resolution of the guards to be made; and
   an emulation unit including control circuitry which cooperates with the decode unit to selectively control the decode unit to implement a precise watch mode or a non-precise watch mode on detection of a breakpoint caused by a fetched instruction having a specified program count or a fetched instruction having a specified opcode, wherein when the decode unit implements the precise watch mode, the fetched instruction causing the breakpoint and at least one subsequent instruction are not permitted to be executed until after a guard value associated with the fetched instruction is resolved and, when the decode unit implements the non-precise watch mode, the instruction causing the breakpoint and at least one subsequent instruction are permitted to be executed before the guard value associated with the fetched instruction is resolved.

2. A computer system according to claim 1, which is implemented on a single chip.

3. A computer system according to claim 1, which includes a program memory for holding said instructions to be executed.

4. A computer system according to claim 1, wherein the emulation unit is associated with an emulation program memory which holds debug code which is executed in a debug mode.

5. A computer system according to claim 1, wherein, when the emulation unit is in a precise watch mode, it is operable to issue a request to the at least one pipelined execution unit for guard resolution, the guard resolution being transmitted to the control circuitry of the emulation unit which is responsive thereto to control operation of the decode unit.

6. A computer system according to claim 5, wherein the control circuitry of the emulation unit is operable to issue one of a go command and divert command to the decode unit responsive to receipt of the guard resolution from the at least one pipelined execution unit, wherein a go command allows the instruction which caused the breakpoint and subsequent instructions to be normally decoded and executed, and a divert command sets the computer system into a debug mode.

7. A computer system according to claim 1, wherein, when the emulation unit is in non-precise watch mode, the instruction which caused the breakpoint and subsequent instructions are decoded and executed normally until such time as said instruction reaches the at least one pipelined execution unit where its guard is resolved such that a commit signal is generated to the control circuitry of the emulation unit, and wherein the emulation unit is responsive to receipt of the commit signal to set the computer system into a debug mode.

8. A computer system according to claim 1, which includes a microinstruction generator which receives instructions from the decode unit and supplies microinstructions to the at least one pipelined execution unit, said microinstructions including fields for holding respective guards to be resolved.

9. A computer system according to claim 1, which includes a plurality of parallel pipelined execution units, including at least two data unit pipelines for executing data processing instructions and at least two address unit pipelines for executing memory access instructions.

10. A method of debugging an on-chip processor which is arranged to execute predicated instructions wherein each instruction includes a guard, the value of which determines whether or not that instruction is executed, the method comprising:
fetching instructions to be executed;
decoding said instructions;
executing decoded instructions, said executing step including resolving values of the guards of the instructions; and
detecting instructions which have a debug effect based on a program count or an opcode of the instructions and acting on said instructions in dependence on whether the processor is in a precise watch mode or a non-precise watch mode wherein, according to the precise watch mode, an instruction having a debug effect and at least one subsequent instruction are not permitted to be executed until after a guard value associated with the instruction is resolved and, according to a non-precise watch mode, the instruction and the at least one subsequent instruction are permitted to be executed before the guard value is resolved.

11. A method according to claim 10, wherein breakpoints are detected at instructions having certain program counts.

12. A method according to claim 10, wherein breakpoints are detected at instructions having certain opcodes.

13. A method according to claim 10, wherein, in a precise watch mode, a request for guard resolution is issued such that an instruction guard is resolved prior to execution of the instruction, selectively causing issue of one of a go command and a debug command responsive to the guard resolution.

14. A method according to claim 12, wherein, in a debug mode, debug code is executed by the processor.

15. A method according to claim 10, wherein, in a non-precise watch mode, the instruction which caused the breakpoint and subsequent instructions are decoded and executed normally until such time as the guard of the breakpoint instruction has been resolved wherein, if the guard is resolved such that a position commit signal is generated, the processor is set into the debug mode.

16. A computer system for executing predicated instructions wherein each instruction includes a guard, the value of which determines whether or not that instruction is executed, the computer system comprising:
a fetch unit for fetching instructions to be executed;
a decode unit for decoding said instructions;
at least one pipelined execution unit for executing decoded instructions and being associated with a guard register file holding values of the guards to allow resolution of the guards to be made; and
an emulation unit including control circuitry which cooperates with the decode unit to selectively control the decode unit to implement a precise watch mode or a non-precise watch mode on detection of a breakpoint caused by a fetched instruction having a specified program count or a fetched instruction having a specified opcode, wherein when the decode unit implements the precise watch mode, the fetched instruction causing the breakpoint and at least one subsequent instruction are not permitted to be executed until after a guard value associated with the fetched instruction is resolved and, when the decode unit implements the non-precise watch mode, the fetched instruction causing the breakpoint and at least one subsequent instruction are permitted to be executed before the guard value is resolved, wherein, when the decode unit implements the precise watch mode, the emulation unit is operable to issue a request to the at least one pipelined execution unit for guard resolution, the guard resolution being transmitted to the control circuitry of the emulation unit which is responsive thereto to control operation of the decode unit.

17. A computer system according to claim 16, wherein the control circuitry of the emulation unit is operable to issue one of a go command and divert command to the decode unit responsive to receipt of the guard resolution from the at least one pipelined execution unit, wherein a go command allows the instruction which caused the breakpoint and subsequent instructions to be normally decoded and executed, and a divert command sets the computer system into a debug mode.

18. A computer system according to claim 16, wherein, when the emulation unit is in non-precise watch mode, the instruction which caused the breakpoint and subsequent instructions are decoded and executed normally until such time as said instruction reaches the at least one pipelined execution unit where its guard is resolved such that a commit signal is generated to the control circuitry of the emulation unit, and wherein the emulation unit is responsive to receipt of the commit signal to set the computer system into a debug mode.

* * * * *